(12) United States Patent
Araki et al.

(10) Patent No.: US 10,367,438 B2
(45) Date of Patent: Jul. 30, 2019

(54) INVERTER CONTROL DEVICE (71) Applicant: Hitachi Automotive Systems, Ltd., Hitachinaka-shi, Ibaraki (JP)

(72) Inventors: Takahiro Araki, Tokyo (JP); Hideki Miyazaki, Hitachinaka (JP); Toshisada Mitsui, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/575,909

(22) PCT Filed: May 11, 2016

(86) PCT No.: PCT/JP2016/063941
§ 371 (c)(1),
(2) Date: Nov. 21, 2017

(87) PCT Pub. No.: WO2016/190093
PCT Pub. Date: Dec. 1, 2016

(65) Prior Publication Data
US 2018/0152128 A1 May 31, 2018

(30) Foreign Application Priority Data
May 25, 2015 (JP) .................................. 2015-105075

(51) Int. Cl.
*H02P 21/22* (2016.01)
*H02P 27/12* (2006.01)
(Continued)

(52) U.S. Cl.
CPC .............. *H02P 21/22* (2016.02); *H02P 27/06* (2013.01); *H02P 27/08* (2013.01); *H02P 27/12* (2013.01)

(58) Field of Classification Search
CPC ............ H02P 21/22; H02P 27/06; H02P 27/12
See application file for complete search history.

(56) References Cited

U.S. PATENT DOCUMENTS 6,992,452 B1 * 1/2006 Sachs .................... H02P 29/032
318/434
7,615,951 B2 * 11/2009 Son ......................... H02P 29/64
318/432
(Continued)

FOREIGN PATENT DOCUMENTS

EP 2 790 315 A1 10/2014
FR 2 974 466 A1 10/2012
(Continued)

OTHER PUBLICATIONS

J. Hwang and H. Wei, "The Current Harmonics Elimination Control Strategy for Six-Leg Three-Phase Permanent Magnet Synchronous Motor Drives," in IEEE Transactions on Power Electronics, vol. 29, No. 6, pp. 3032-3040, Jun. 2014.*

(Continued)

*Primary Examiner* — Bickey Dhakal
*Assistant Examiner* — Said Bouziane
(74) *Attorney, Agent, or Firm* — Crowell & Moring LLP (57) ABSTRACT

An object of the present invention is to reduce an overcurrent of an inverter and a motor. A control device for an electric motor in which windings of respective phases are independently connected, the control device for the electric motor uses a zero-phase current calculation means for calculating a zero-phase current based on detection values of currents of the respective phases flowing in the electric motor and a position of a rotor of the electric motor to control a current flowing in the electric motor such that a vector sum of a drive current and the zero-phase current is equal to or lower than a predetermined current.

5 Claims, 8 Drawing Sheets

(51) Int. Cl.
*H02P 27/06* (2006.01)
*H02P 27/08* (2006.01)

(56) References Cited

U.S. PATENT DOCUMENTS

2010/0219780 A1* 9/2010 Morimoto ........... H02P 21/0089
 318/400.02
2014/0306627 A1 10/2014 Bruyere et al.

FOREIGN PATENT DOCUMENTS

| JP | 2004-80975 A | 3/2004 |
| JP | 2007-60852 A | 3/2007 |
| JP | 2015-73373 A | 4/2015 |

OTHER PUBLICATIONS

International Search Report (PCT/ISA/210) issued in PCT Application No. PCT/JP2016/063941 dated Aug. 16, 2016 with English-language translation (Two (2) pages).
Japanese-language Written Opinion (PCT/ISA/237) issued in PCT Application No. PCT/JP2016/063941 dated Aug. 16, 2016 (Three (3) pages).
Extended European Search Report issued in counterpart European Application No. 16799801.2 dated Dec. 19, 2018 (10 pages).

\* cited by examiner

INVERTER CONTROL DEVICE

TECHNICAL FIELD

The present invention relates to an inverter control device, and particularly to an in-vehicle inverter control device.

BACKGROUND ART

There are demands for improvement of reliability from the viewpoint of prevention of failure occurrence during traveling of a vehicle and improvement of an output torque from the viewpoint of weight reduction of the vehicle in hybrid cars and electric cars. Three-phase six-wire type driving devices have been considered in response to such demands, but there is a problem that a 3n-order harmonic current is superimposed on a drive current for driving an electric motor and a loss such as a copper loss increases because the electric motor to which a neutral point is not connected is used.

One of background art in this technical field is JP 2004-80975 A (PTL 1). In this publication, it is described that "a 3n-order harmonic voltage command value for canceling a 3n-order harmonic current (3 is the number of phases, n is an integer) included in a drive current for driving an electric motor is calculated, and a three-phase voltage command value is corrected". Accordingly, a target voltage is corrected so as to cancel the 3n-order harmonic current, and thus, it is possible to the harmonic current in the drive current and to reduce the loss caused by the harmonic current.

CITATION LIST

Patent Literature

PTL 1: JP 2004-80975 A

SUMMARY OF INVENTION

Technical Problem

In the method described in PTL 1, there is a risk that an overcurrent is generated without eliminating the harmonic current when a frequency of the 3n-order harmonic current exceeds a controllable frequency of an inverter control device.

An object of the present invention is to reduce an overcurrent of an inverter and a motor.

Solution to Problem

In order to solve the above-described problem, the present invention relates to a control device for an electric motor in which windings of respective phases are independently connected. A zero-phase current calculation means for calculating a zero-phase current based on detection values of currents of the respective phases flowing in the electric motor and a position of a rotor of the electric motor is used to control a current flowing in the electric motor such that a vector sum of a drive current and the zero-phase current is equal to or lower than a predetermined current.

Advantageous Effects of Invention

According to an inverter control device according to the present invention, it is possible to reduce the overcurrent of the inverter and the motor.

DESCRIPTION OF EMBODIMENTS

Hereinafter, embodiments of the present invention will be described with reference to the drawings. Meanwhile, the present invention is not construed to be limited to the embodiments, and a technical idea of the present invention may be implemented by combining other well-known constituent elements. Incidentally, the same elements will be denoted by the same reference signs in the respective drawings, and the redundant description thereof will be omitted.

Figure 1:
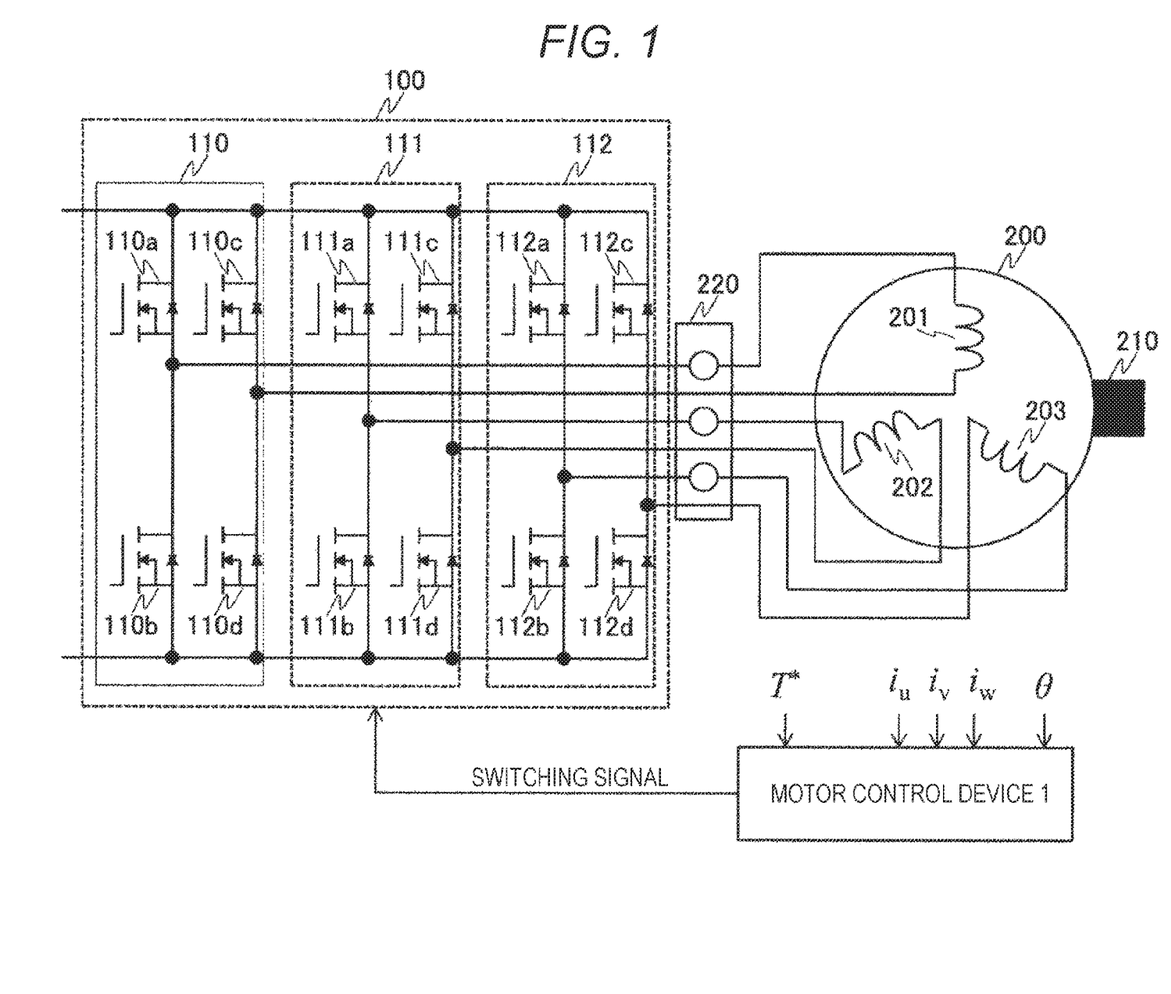
FIG. 1 is a diagram illustrating a configuration of a motor drive device.

FIG. 1 is a diagram illustrating a configuration of a motor drive device according to a first embodiment.

The motor drive device includes a motor 200, a position sensor 210, a current sensor 220, an inverter 100, and a motor control device 1.

The motor 200 is configured using an interior permanent magnet synchronous motor or the like to which a neutral point is not connected. A U-phase winding 201 wound around a stator of the motor 200 is connected to an output terminal of a U-phase full bridge inverter 110. A V-phase winding 202 wound around the stator of the motor 200 is connected to an output terminal of a V-phase full bridge inverter 111. A W-phase winding 202 wound around the stator of the motor 200 is connected to an output terminal of a W-phase full bridge inverter 112.

The motor 200 according to the present embodiment independently controls each current flowing in the U-phase winding 201, the V-phase winding 202, and the W-phase winding 203 since the neutral point is not connected thereto. However, a drive current flowing in the U-phase winding 201, the V-phase winding 202, and the W-phase winding 203 includes a 3n-order harmonic current since the neutral point is not connected to the motor 200.

The position sensor 210 detects a position of a rotor of the motor 200 and outputs a detected rotor position θ. The current sensor 220 detects the currents flowing in the U-phase winding 201, the V-phase winding 202, and the W-phase winding 203, which are wound around the stator of the motor 200, and outputs detected three-phase currents $i_u$, $i_v$, and $i_w$.

The inverter 100 includes the U-phase full bridge inverter 110, the V-phase full bridge inverter 111, and the W-phase full bridge inverter 112. The U-phase full bridge inverter 110, the V-phase full bridge inverter 111, and the W-phase full bridge inverter 112 are connected in parallel to a DC power supply (not illustrated).

The U-phase full bridge inverter 110 is composed of switching elements 110a to 110d. The switching elements 110a and 110b constitute a U-phase first leg and the switching elements 110c and 110d constitute a U-phase second leg. The switching elements 110a and 110c are arranged on an upper arm, and the switching elements 110b and 110d are connected to a lower arm. Similarly, the V-phase full bridge inverter 111 is composed of switching elements 111a to 111d, and the W-phase full bridge inverter 112 is composed of switching elements 112a to 112d.

The switching elements 110a to 110d, 111a to 111d, and 112a to 112d are turned on or off based on a switching signal generated by the inverter control device 1. As a result, the inverter 100 converts a DC voltage applied from the DC power supply (not illustrated) to an AC voltage. The converted AC voltage is applied to the three-phase windings 201 to 203 wound around the stator of the motor 200 to generate a three-phase AC current. This three-phase AC current causes the motor 200 to generate a rotating magnetic field so that the rotor 210 rotates.

The switching elements 110a to 110d, 111a to 111d, and 112a to 112d are configured by combining a metal-oxide semiconductor field effect transistor (MOSFET) or an insulated gate bipolar transistor (IGBT), and a diode. In the present embodiment, a description will be given with the configuration using the MOSFET and the diode.

The motor control device 1 performs PWM control of the inverter 100 based on a torque command T* from the outside, the three-phase currents $i_u$, $i_v$, and $i_w$ detected by the current sensor 220, and the rotor position $\theta$ detected by the position sensor 210.

Figure 2:
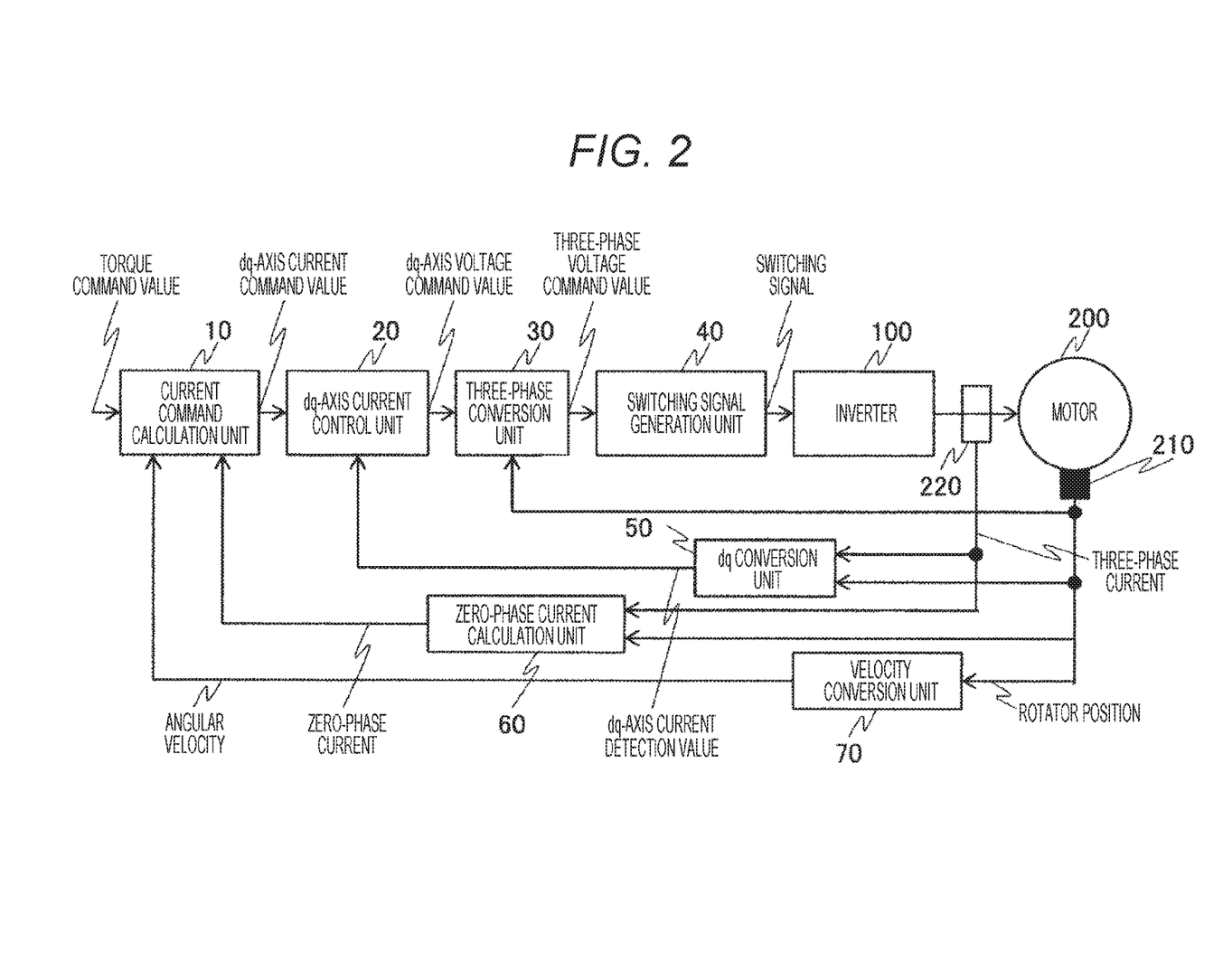
FIG. 2 is a block diagram illustrating a control operation according to a first embodiment.

FIG. 2 is a block diagram illustrating a control operation according to the first embodiment. FIG. 2 is a control block diagram for describing a first example of the present invention according to the first embodiment.

The torque command value T*, an angular velocity $\omega$, and a zero-phase current $i_0$ are input to the current command calculation unit 10, and dq-axis current command values $i_d^*$ and $i_q^*$ that do not exceed a predetermined current value $i_{max}$ are calculated based on Formula (1).

[Formula 1]

$$\sqrt{(i_d^*)^2+(i_q^*)^2} \leq \sqrt{(i_{max})^2-(i_0)^2}: \quad (1)$$

The predetermined current value $i_{max}$ means a maximum current value set in order to prevent failure of the inverter 100 and the motor 200.

Based on the input target torque T* and the angular velocity $\omega$, the current command calculation unit 10 outputs appropriate dq-axis current command values $i_d^*$ and $i_q^*$ that satisfy the condition of Formula (1). As a method of calculating the dq-axis current command values $i_d^*$ and $i_q^*$, it is possible to use a method such as maximum torque current control and field-weakening control. Incidentally, a table set in advance may be used to calculate the dq-axis current command values $i_d^*$ and $i_q^*$.

The dq-axis current command values $i_d^*$ and $i_q^*$ and dq-axis current detection values $i_d$ and $i_q$ are input to a dq-axis current control unit 20, and dq-axis voltage command values $v_d^*$ and $v_q^*$ are output using proportional control, integral control, or the like. The dq-axis voltage command values $v_d^*$ and $v_q^*$ and the rotor position $\theta$ are input to a three-phase conversion unit 30 and three-phase voltage command values $v_u^*$, $v_v^*$, and $v_w^*$ are output. The three-phase voltage command values $v_u^*$, $v_v^*$, and $v_w^*$ are input to a switching signal generation unit 40, and a switching signal to turn on or off the switching elements 110a to 110d, 111a to 111d, and 112a to 112d is generated. Further, the switching signal is input to the inverter 100, and the motor is driven by the above-described operation.

The three-phase currents $i_u$, $i_v$, and $i_w$ detected by the current sensor 220 and the rotor position $\theta$ detected by the position sensor 210 are input to a dq conversion unit 50, and the dq-axis current detection values $i_d$ and $i_q$ are output.

The three-phase currents $i_u$, $i_v$, and $i_w$ detected by the current sensor 220 and the rotor position $\theta$ detected by the position sensor 210 are input to a zero-phase current calculation unit 60, and the zero-phase current $i_0$ is output. A calculation formula for the zero-phase current $i_0$ is illustrated in Formula (2).

[Formula 2]

$$i_0 = \frac{i_u}{\sqrt{3}} + \frac{i_v}{\sqrt{3}} + \frac{i_w}{\sqrt{3}} \quad (2)$$

Incidentally, the zero-phase current $i_0$ varies depending on rotational speed of the motor 200, and thus, may be calculated in consideration of a zero-phase current value estimated from the angular velocity $\omega$.

The rotor position $\theta$ detected by the position sensor 210 is input to a velocity conversion unit 70, and the angular velocity $\omega$ is output.

Figure 3:
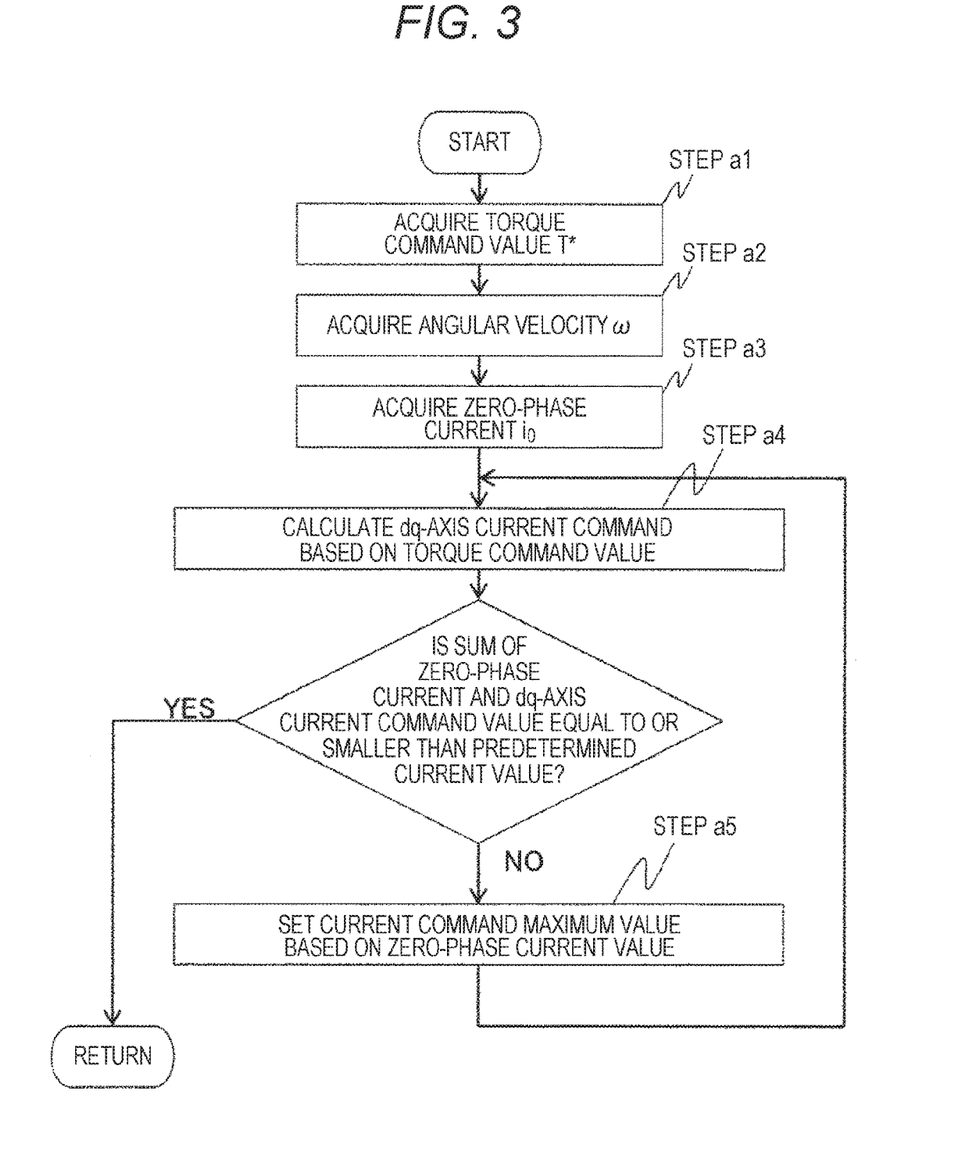
FIG. 3 is a view illustrating a flowchart of a current command calculation unit 10.

FIG. 3 is a flowchart of the current command calculation unit 10. First, the current command calculation unit 10 acquires the torque command value T* in Step a1. Next, the current command calculation unit 10 acquires the angular velocity $\omega$ output from the velocity conversion unit 70 in Step a2. Next, the current command calculation unit 10 acquires the zero-phase current $i_0$ output from the zero-phase current calculation unit 60 in Step a3. Next, the current command calculation unit 10 calculates the dq-axis current command values $i_d^*$ and $i_q^*$ based on the torque command value T* and the angular velocity $\omega$ in Step a4.

Subsequently, when a sum of the dq-axis current command values $i_d^*$ and $i_q^*$ and the zero-phase current $i_0$ is equal to or lower than a predetermined current value, the current command calculation unit ends the processing and outputs the dq-axis current command values $i_d^*$ and $i_q^*$.

On the other hand, when the sum of the dq-axis current command values $i_d^*$ and $i_q^*$ and the zero-phase current $i_0$ is higher than the predetermined current value, a current command maximum value is reset based on the zero-phase current $i_0$ in Step a5, and the processing returns to the process in Step a4.

In this manner, the control device for the electric motor according to the present embodiment controls the current flowing in the electric motor such that a vector sum of the drive current and the zero-phase current is equal to or lower than the predetermined current. Accordingly, it is possible to prevent an overcurrent from flowing in the inverter and the motor. According to the present embodiment, it is possible to prevent the generation of the overcurrent caused by zero-phase current even during high-speed rotation of the electric motor. This also prevents overcurrent breakdown, thereby improving the reliability. In addition, it is possible to maximize the d-axis current and the q-axis current within a range where the overcurrent breakdown can be prevented, and thus, the output is improved.

The implementation of a control method according to the present embodiment can be confirmed by confirming whether a sum of the d-axis current and the q-axis current, which are drive currents, increases or decreases in the case of changing the rotational speed of the motor 200. For example, the zero-phase current relatively increases during the high-speed rotation of the motor 200, and thus, the sum of the d-axis current and the q-axis current decreases.

Figure 4:
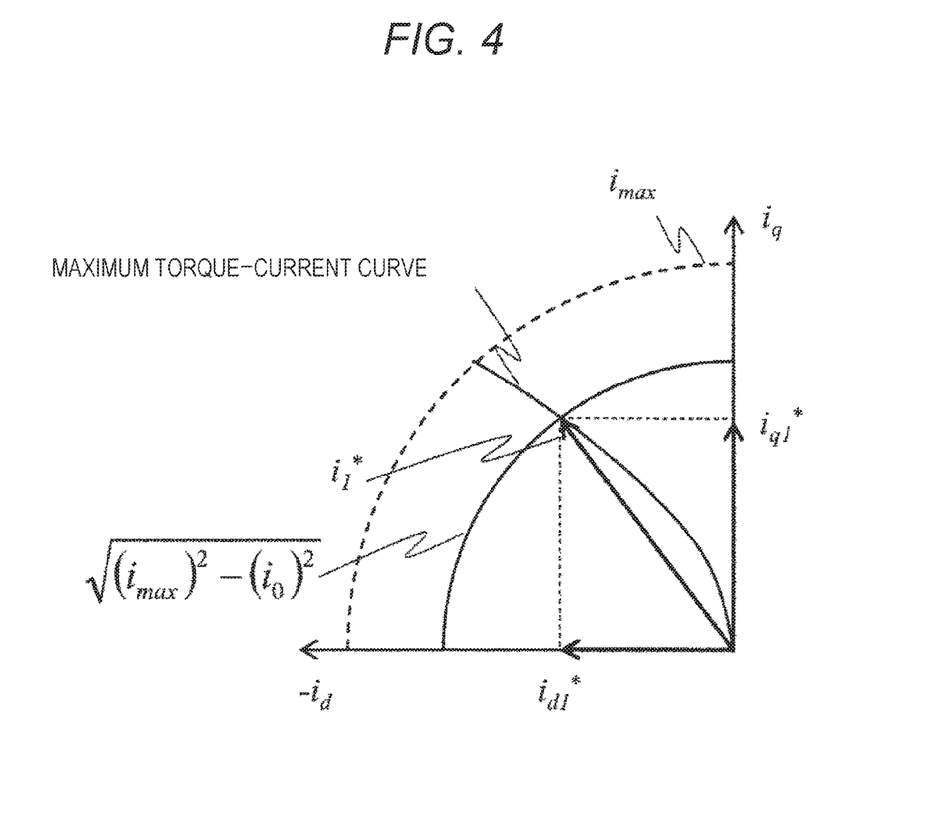
FIG. 4 is a vector view for describing an operation of the current command calculation unit 10 when maximum torque current control is applied.

FIG. 4 is a current vector view when the motor 200 is driven by the maximum torque current control. Here, $i_1^*$ is a current command vector during the maximum torque current control and is a vector sum of a d-axis current command vector $i_{d1}^*$ and a q-axis current command vector $i_{q1}^*$. The dotted arc indicates a magnitude of a predetermined current $i_{max}$. When the zero-phase current $i_0$ flows in the inverter 100 and the motor 200, a magnitude of the current vector that can be output by the inverter 100 is restricted to the solid-line arc depending on a magnitude of the zero-phase current $i_0$ in order to prevent the overcurrent from flowing in the inverter 100 and the motor 200. Therefore, it is possible to prevent the overcurrent by controlling an inverter current in a region within the solid-line arc.

Figure 5:
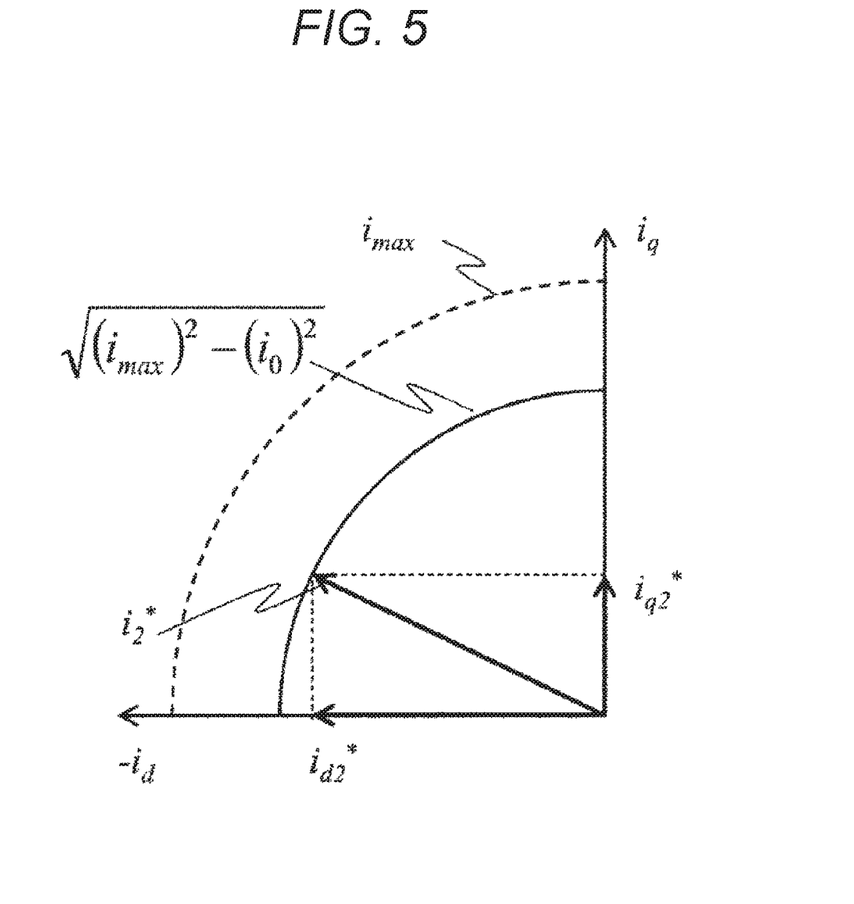
FIG. 5 is a vector view for describing the operation of the current command calculation unit 10 when field-weakening control is applied.

FIG. 5 is a current vector view when the motor 200 is driven by the field-weakening control. Here, $i_2^*$ is a current command vector during the field-weakening control and is a vector sum of a d-axis current command vector $i_{d2}^*$ and a q-axis current command vector $i_{q2}^*$. The dotted arc indicates a magnitude of a predetermined current $i_{max}$. Even in the field-weakening control, the magnitude of the current vector that can be output by the inverter 100 is restricted to the solid-line arc depending on the magnitude of the zero-phase current $i_0$ in order to prevent the overcurrent from flowing in the inverter 100 and the motor 200 when the zero-phase current $i_0$ flows in the inverter 100 and the motor 200, which is similar to the maximum torque current control described above. Since the d-axis current command value $i_{d2}^*$ is determined from the rotational speed of the motor 200, the q-axis current command value $i_{q2}^*$ is obtained by Formula (3) in the field-weakening control. Incidentally, a table set in advance may be used here.

[Formula 3]

$$i_{q2}^* = \sqrt{(i_{max})^2 - (i_0)^2 - (i_{d2}^*)^2}: \qquad (3)$$

Figure 6:
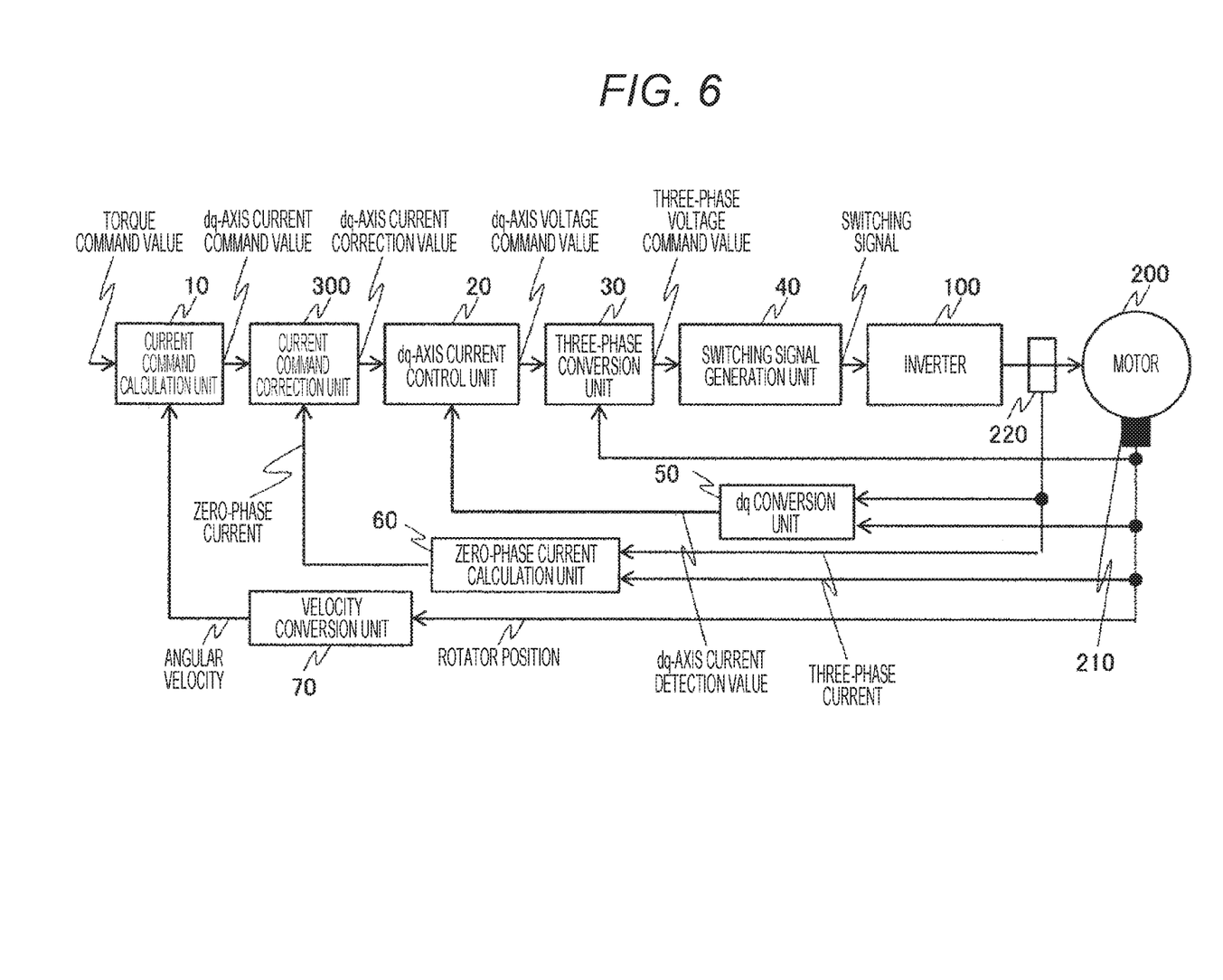
FIG. 6 is a block diagram illustrating a control operation according to a second embodiment.

FIG. 6 is a block diagram illustrating a second embodiment. A configuration of FIG. 6 is a configuration obtained by adding a current command correction unit 300 to FIG. 2. In FIG. 6, the current command calculation unit 10 calculates the d-axis current command values $i_d^*$ and $i_q^*$ that do not exceed the predetermined current $i_{max}$ without considering the zero-phase current $i_0$ according to the input torque command value T*. The dq-axis current command values $i_d^*$ and $i_q^*$ and the zero-phase current $i_0$ are input to the current command correction unit 300, and the dq-axis current command values $i_d^*$ and $i_q^*$ are corrected so as to satisfy the condition of Formula (1). At this time, it is possible to correct only the q-axis current command value $i_q^*$ or only the d-axis current command value $i_d^*$, or both the d-axis current command value $i_d^*$ and the q-axis current command value $i_q^*$.

Figure 7:
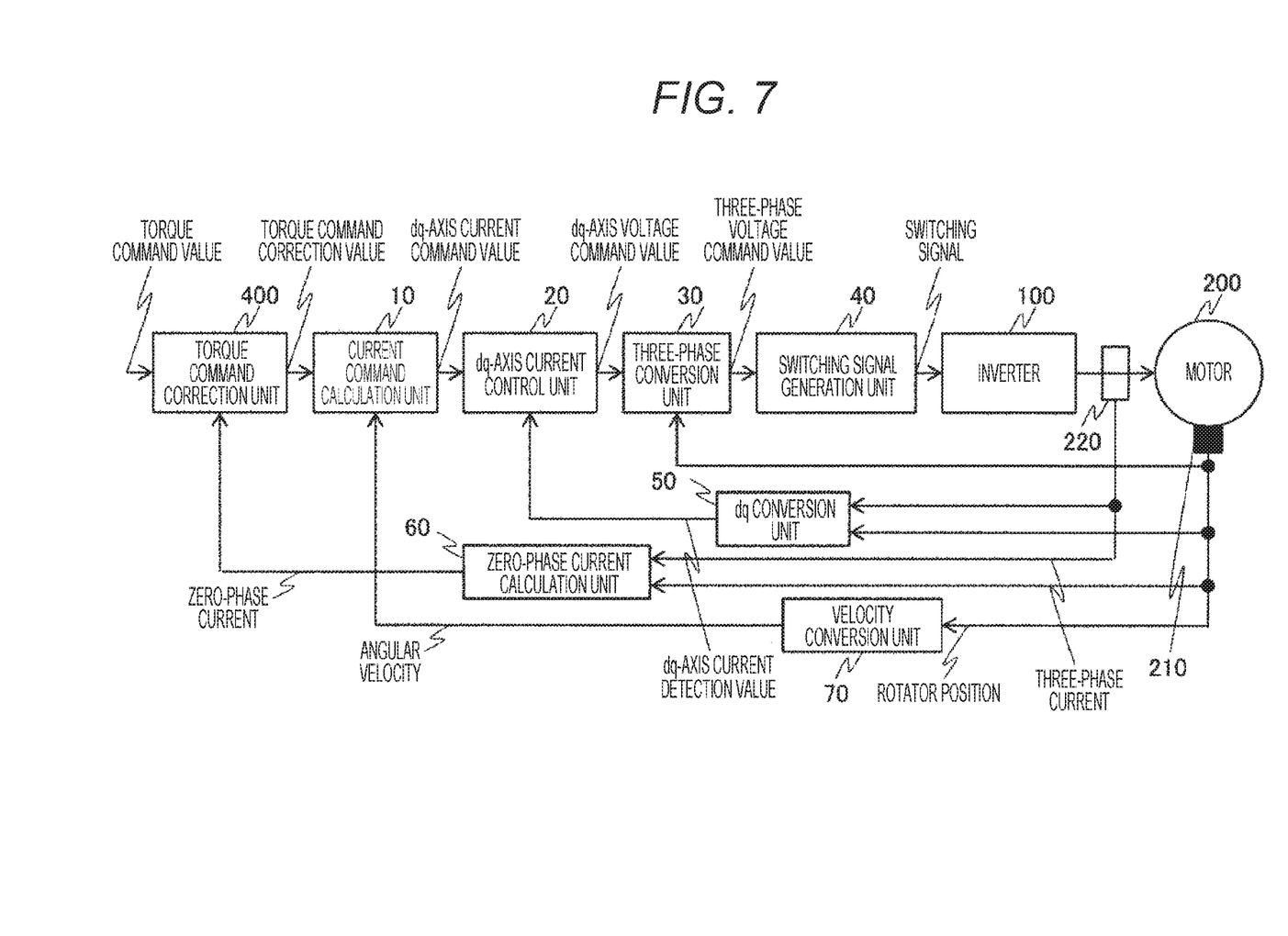
FIG. 7 is a block diagram illustrating a control operation according to a third embodiment.

FIG. 7 is a block diagram, illustrating a third embodiment. A configuration of FIG. 7 is a configuration obtained by adding a torque command correction unit 400 to FIG. 2. In FIG. 7, the torque command value T* and the zero-phase current $i_0$ are input to the torque command correction unit 400, the torque command value T* is corrected using a table set in advance, and the corrected torque command value is output. By the above-described correction, the torque command value T*, which enables the sum of the dq-axis current command values $i_d^*$ and $i_q^*$ and the zero-phase current $i_q^*$ to be equal to or lower than the predetermined current, is generated.

Figure 8:
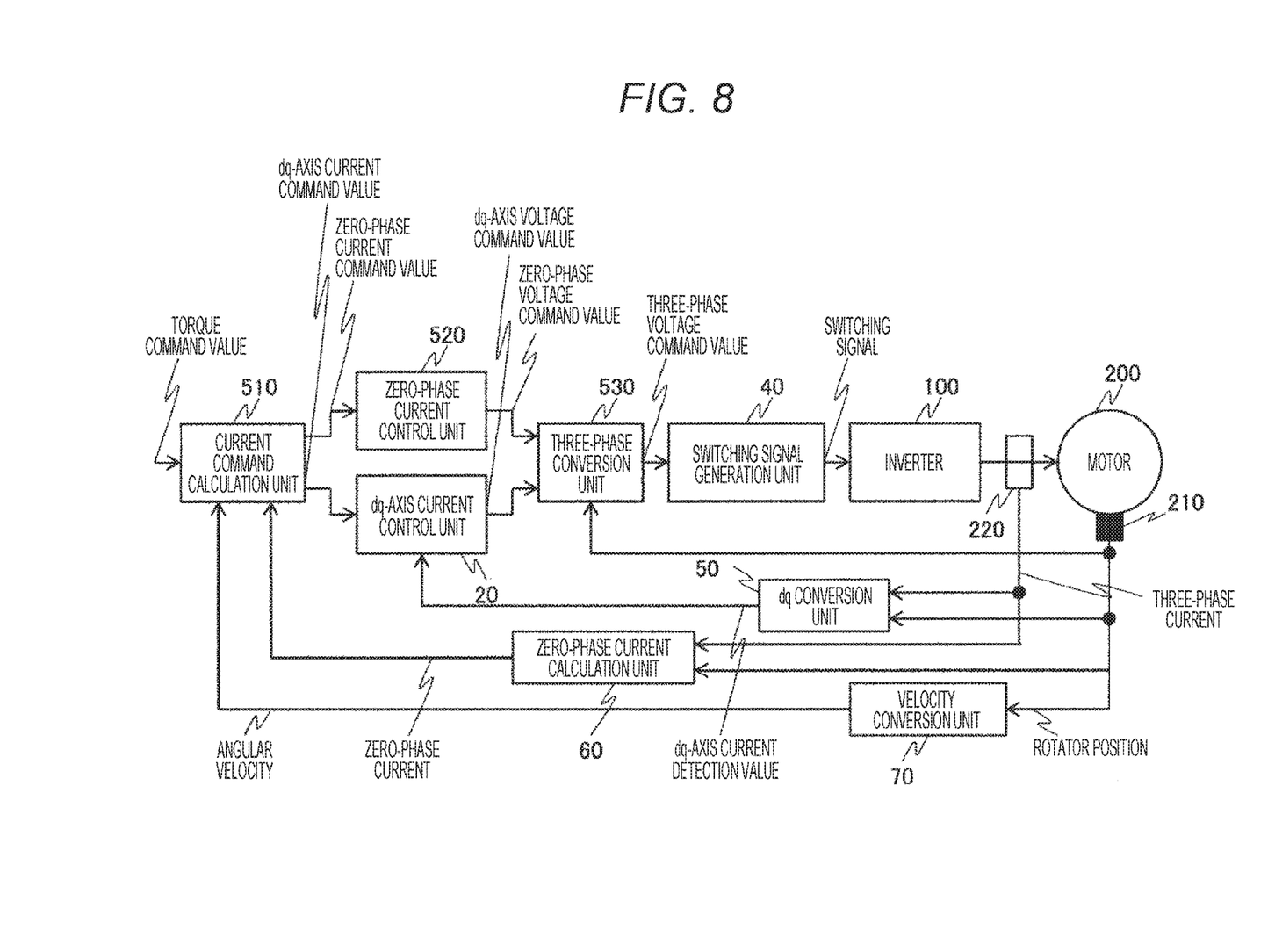
FIG. 8 is a block diagram illustrating a control operation according to a fourth embodiment.

FIG. 8 is a block diagram illustrating a fourth embodiment. A configuration of FIG. 8 is a configuration obtained by adding a zero-phase current control unit 520 to FIG. 2. In FIG. 8, a current command calculation unit 510 outputs appropriate dq-axis current command value $i_{d0}^*$ and $i_{q0}^*$ that satisfy a condition of Formula (4) and a zero-phase current command value $i_0^*$ based on the input torque command value T*, the angular velocity ω, and the zero-phase current $i_0$.

[Formula 4]

$$\sqrt{(i_{d0}^*)^2 + (i_{q0}^*)^2 + (i_0^*)^2} \le i_{max}: \qquad (4)$$

The zero-phase current command value $i_0^*$ is input to the zero-phase current control unit 520, and a zero-phase voltage command value $v_0^*$ is output using proportional control, integral control, or the like.

The dq-axis voltage command values $v_d^*$ and $v_q^*$ and the zero-phase voltage command value $v_0^*$ are input to a three-phase conversion unit 530, and the three-phase voltage command values $v_u^*$, $v_v^*$, and $v_w^*$ are output based on Formula (5).

[Formula 5]

$$\begin{bmatrix} v_u^* \\ v_v^* \\ v_w^* \end{bmatrix} = \sqrt{\frac{2}{3}} \begin{bmatrix} 1 & 0 & \frac{1}{\sqrt{2}} \\ -\frac{1}{2} & \frac{\sqrt{3}}{2} & \frac{1}{\sqrt{2}} \\ -\frac{1}{2} & -\frac{\sqrt{3}}{2} & \frac{1}{\sqrt{2}} \end{bmatrix} \begin{bmatrix} v_d^* \\ v_q^* \\ v_0^* \end{bmatrix} \qquad (5)$$

In the configuration of FIG. 8, the dq-axis current command values $i_{d0}^*$ and $i_{q0}^*$ that satisfy the condition of Formula (4) and the zero-phase current command value $i_0^*$ are output in the current command calculation unit 510, and thus, the current flowing in the motor is controlled to be equal to or lower than the predetermined current.

According to the control device for the electric motor according to the above-described embodiments, it is possible to obtain the effect that the overcurrent of the inverter and the motor is reduced by controlling the current flowing in the electric motor such that the vector sum of the drive current and the zero-phase current is equal to or lower than the predetermined current.

The control device for the electric motor according to the above-described embodiment is mounted to, for example, an electric vehicle that is driven by the electric motor. In the motor drive device illustrated in FIG. 1, a voltage utilization rate of the inverter is improved to about 1.7 times as compared with that of the case of using an electric motor to which a neutral point is connected, and thus, it is possible to obtain effects such as extension of cruising distance of an electric vehicle and reduction in size of the electric vehicle. Further, it is possible to provide a highly reliable electric vehicle suppressed in overcurrent breakdown.

REFERENCE SIGNS LIST

10 current command calculation unit
20 dq-axis current control unit 30 three-phase conversion unit
50 dq conversion unit
60 zero-phase current calculation unit
70 velocity conversion unit
100 inverter
110 U-phase full bridge inverter
110a switching element
110b switching element
110c switching element
110d switching element
111 V-phase full bridge inverter
110a switching element
110b switching element
110c switching element
110d switching element
112 W-phase full bridge inverter
112a switching element
112b switching element
112c switching element
112d switching element
200 motor
210 position sensor
220 current sensor
300 current command correction unit
400 torque command correction unit
510 current command calculation unit during zero-phase current control
520 zero-phase current control unit
530 three-phase conversion unit during zero-phase current control
$i_u$ U-phase current
$i_v$ V-phase current
$i_w$ W-phase current
T* torque command value
ω angular velocity
$i_0$ zero-phase current
$i_d^*$ d-axis current command value
$i_q^*$ q-axis current command value
$i_d$ d-axis current detection value
$i_q$ q-axis current detection value
$v_d^*$ d-axis voltage command value
$v_q^*$ q-axis voltage command value
$v_u^*$ U-phase voltage command value
$v_v^*$ V-phase voltage command value
$v_w^*$ W-phase voltage command value
$i_{d1}^*$ d-axis current command value during maximum torque current control
$i_{q1}^*$ q-axis current command value during maximum torque current control
$i_{d2}^*$ d-axis current command value during the field-weakening control
$i_{q2}^*$ q-axis current command value during field-weakening control
$i_1^*$ current command vector during maximum torque current control
$i_2^*$ current command vector during field-weakening control
$i_{d0}^*$ d-axis current command value during zero-phase current control
$i_{q0}^*$ q-axis current command value during zero-phase current control
$i_0^*$ zero-phase current command value
$v_0^*$ zero-phase voltage command value

The invention claimed is:

1. A control device for an electric motor in which windings of respective phases are independently connected, the control device for the electric motor comprising
a zero-phase current calculation means for calculating a zero-phase current based on detection values of currents of the respective phases flowing in the electric motor and a position of a rotor of the electric motor, wherein
a current flowing in the electric motor is controlled such that a vector sum of a drive current and the zero-phase current is equal to or lower than a predetermined current, and
when the drive current is higher than a first current which is a current obtained by subtracting a component of the zero-phase current, calculated by the zero-phase current calculation means, from the predetermined current, the drive current is controlled to be equal to or lower than the first current.

2. The control device for the electric motor according to claim 1, further comprising:
a current command generation unit that generates a current command based on a torque command of the electric motor and the position of the rotor of the electric motor; and
a current command correction unit that corrects the current command, generated by the current command generation unit, based on the zero-phase current calculated by the zero-phase current calculation unit.

3. The control device for the electric motor according to claim 1, further comprising
a torque command correction unit that corrects a torque command of the electric motor based on the zero-phase current calculated by the zero-phase current calculation unit.

4. The control device for the electric motor according to claim 1, wherein
the drive current and the zero-phase current are controlled such that the vector sum of the drive current and the zero-phase current is equal to or lower than the predetermined current.

5. An electric vehicle comprising the control device for the electric motor according to claim 1.

* * * * *